(12) United States Patent
Sugimoto et al.

(10) Patent No.: US 10,096,214 B2
(45) Date of Patent: Oct. 9, 2018

(54) TACTILE PRESENTATION DEVICE AND CONTROL METHOD FOR THE SAME

(71) Applicant: TIANMA JAPAN, LTD., Kawasaki, Kanagawa (JP)

(72) Inventors: Daisuke Sugimoto, Kawasaki (JP); Hiroshi Haga, Kawasaki (JP)

(73) Assignee: TIANMA JAPAN, LTD., Kawasaki, Kanagawa (JP)

(*) Notice: Subject to any disclaimer, the term of this patent is extended or adjusted under 35 U.S.C. 154(b) by 0 days.

(21) Appl. No.: 15/715,269

(22) Filed: Sep. 26, 2017

(65) Prior Publication Data

US 2018/0089967 A1 Mar. 29, 2018

(30) Foreign Application Priority Data

Sep. 29, 2016 (JP) .................. 2016-204707

(51) Int. Cl.
*G08B 6/00* (2006.01)

(52) U.S. Cl.
CPC ...................... *G08B 6/00* (2013.01)

(58) Field of Classification Search
CPC .................. G08B 6/00; G06F 3/016–3/018
USPC .................... 340/407.1, 407.2; 345/173, 174
See application file for complete search history.

(56) References Cited

U.S. PATENT DOCUMENTS

| 4,634,917 A * | 1/1987 | Dvorsky ............... G01B 7/004 310/323.21 |
| 9,235,265 B2 * | 1/2016 | Karamath ............... G06F 3/016 |
| 2014/0176455 A1 * | 6/2014 | Araki ...................... G06F 3/016 345/173 |
| 2015/0103024 A1 | 4/2015 | Haga et al. |

FOREIGN PATENT DOCUMENTS

| JP | 2015-097076 A | 5/2015 |
| WO | 2014/103085 A1 | 7/2014 |

* cited by examiner

*Primary Examiner* — Steven Lim
*Assistant Examiner* — Mancil Littlejohn, Jr.
(74) *Attorney, Agent, or Firm* — Sughrue Mion, PLLC

(57) ABSTRACT

A circuit of a tactile presentation device is configured to: connect first electrodes at least partially included in a target area to an AC voltage signal source and connect second electrodes at least partially included in the target area to another AC voltage signal source to present tactile senses in the target area; and in transition from a frame to the next frame, turn each of multiple first electrodes including the first electrodes and multiple second electrodes including the second electrodes into a floating state and subsequently connect each of the multiple first electrodes and the multiple second electrodes to a voltage signal source. A time to keep the floating state is set shorter than a first period for unnecessary tactile senses presented outside the target area to be weaker than unnecessary tactile senses presented outside the target area in the first period.

10 Claims, 9 Drawing Sheets

RESULTS OF SUBJECTIVE EVALUATION EXPERIMENT INDICATING RELATIONSHIP
BETWEEN DEAD TIME AND INTENSITY OF UNNECESSARY TACTILE STIMULI

| DEAD TIME Td | SUBJECT A | SUBJECT B | SUBJECT C |
|---|---|---|---|
| 0.3 ms | 1 | 1 | 1 |
| 0.4 ms | 1 | 2 | 1 |
| 0.6 ms | 2 | 2 | 1 |
| 1.0 ms | 3 | 3 | 1 |
| 1.5 ms | 4 | 3 | 2 |
| 2.5 ms | 4 | 4 | 2 |
| 3.5 ms | 4 | 4 | 4 |
| 4.5 ms | 4 | 4 | 4 |

RESULTS OF SUBJECTIVE EVALUATION EXPERIMENT INDICATING RELATIONSHIP
BETWEEN DEAD TIME AND INTENSITY OF UNNECESSARY TACTILE STIMULI

TACTILE PRESENTATION DEVICE AND CONTROL METHOD FOR THE SAME

BACKGROUND

This disclosure relates to a technology to present tactile senses to a human body with electrostatic force.

The background of this invention is tactile presentation technology that is capable of presenting tactile senses with vibration of electrostatic force and presenting the tactile senses in a selected local area. JP 2015-97076 A discloses a tactile sense presentation device or the like that effectively presents a tactile sense (texture feeling) on a touch panel and allows a user to perform an operation solely by tactile sense without seeing the hand. Specifically, the tactile sense presentation device includes a support substrate, a plurality of X electrodes and Y electrodes that are parallel with each other and extend on the support substrate, and driving circuits. The driving circuits apply a voltage signal of a first frequency to the X electrode corresponding to a target region input from the outside, of the X electrodes, apply a voltage signal of a second frequency to the Y electrode corresponding to the target region, of the Y electrodes, and generate an electric beat vibration in the target region on the basis of the absolute value of the difference between the first and second frequencies (ABSTRACT).

When a user touches the surface of a target area with a finger, electrostatic force caused by the beat vibration is generated between the skin and the surface of the target area and the user perceives the electrostatic force as a sense of texture.

SUMMARY

The tactile presentation device as described above is requested to present tactile senses only in the target area and not to present tactile senses outside the target area. However, the inventors found through research that unnecessary tactile senses are occasionally presented outside the target area.

An aspect of the invention is a tactile presentation device including a support substrate, a plurality of first electrodes insulated from each other and disposed on the support substrate, a plurality of second electrodes insulated from each other and further insulated from the plurality of first electrodes, and disposed on the support substrate, and an electrode driving circuit configured to drive the plurality of first electrodes and the plurality of second electrodes. The electrode driving circuit is configured to connect each of the plurality of first electrodes and the plurality of second electrodes to a voltage signal source selected from a plurality of voltage signal sources including two different AC voltage signal sources and a reference voltage signal source. The electrode driving circuit is configured to connect first electrodes at least partially included in a target area among the plurality of first electrodes to an AC voltage signal source and connect second electrodes at least partially included in the target area among the plurality of second electrodes to another AC voltage signal source to present tactile senses in the target area. The electrode driving circuit is configured to, in transition from a tactile presentation frame to the next tactile presentation frame, turn each of the plurality of first electrodes and the plurality of second electrodes into a floating state and subsequently connect each of the plurality of first electrodes and the plurality of second electrodes to a voltage signal source selected from the plurality of voltage signal sources. A time to keep the floating state is set at a period shorter than a first period for unnecessary tactile senses presented outside the target area to be weaker than unnecessary tactile senses presented outside the target area in the first period.

It is to be understood that both the foregoing general description and the following detailed description are exemplary and explanatory and are not restrictive of this disclosure.

DESCRIPTION OF THE EMBODIMENTS

Hereinafter, an embodiment of this invention will be described with reference to the accompanying drawings. It should be noted that the embodiment is merely an example to implement this invention and is not to limit the technical scope of this invention. Throughout the drawings, common elements are denoted by the same reference signs.

The tactile presentation device disclosed hereinafter drives the electrodes with a shorter dead time. The dead time is to keep the electrodes in a floating state. This configuration reduces the unnecessary tactile senses generated outside the target area to present tactile senses.

Configuration of Tactile Presentation Device

Figure 1:
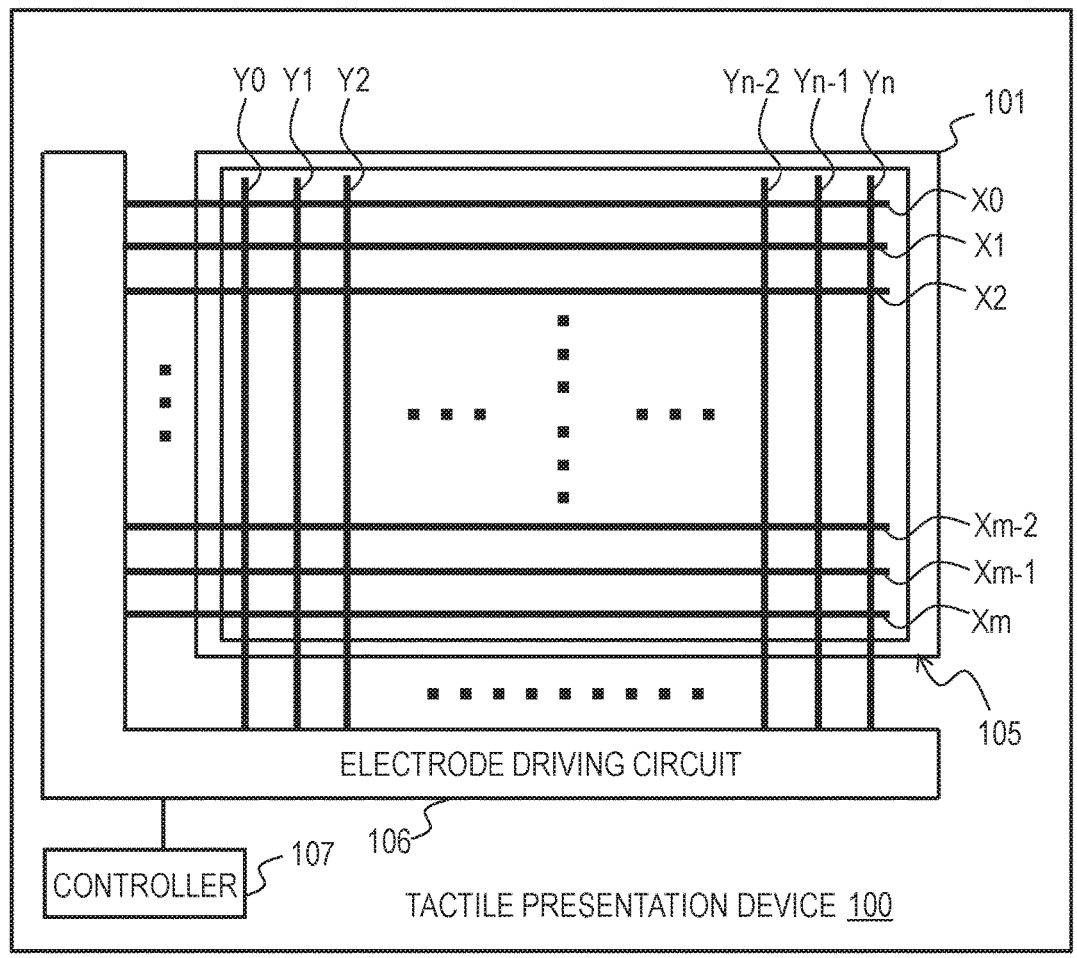
FIG. 1 schematically illustrates a configuration example of a tactile presentation device according to an embodiment.

FIG. 1 schematically illustrates a configuration example of a tactile presentation device. The tactile presentation device 100 includes a tactile panel 105, an electrode driving circuit 106, and a controller 107. The tactile panel 105 includes a support substrate 101 and further, X-electrodes X0 to Xm and Y-electrodes Y0 to Yn arrayed on the support substrate 101. The m and n are natural numbers determined depending on the design. The X-electrodes are first electrodes and the Y-electrodes are second electrodes.

The X-electrodes X0 to Xm extend parallel to one side of the rectangular support substrate 101 and disposed in parallel to one another. The X-electrodes X0 to Xm are isolated from one another. The Y-electrodes Y0 to Yn extend parallel to the other side of the support substrate 101 and disposed in parallel to one another. The Y-electrodes Y0 to Yn are isolated from one another. Each of the X-electrodes X0 to Xm intersects with the Y-electrodes Y0 to Yn. The Y-electrodes Y0 to Yn are isolated from the X-electrodes X0 to Xm by an insulating film at the intersections.

In the example of FIG. 1, the X-electrodes X0 to Xm are parallel to the long side of the support substrate 101 and extend in the horizontal direction of the drawing. The Y-electrodes Y0 to Yn are parallel to the short side of the support substrate 101 and extend in the vertical direction of the drawing. The X-electrodes are orthogonal to the Y-electrodes. The X-electrodes X0 to Xm do not have to be parallel to one another or parallel to one side of the support substrate 101. The Y-electrodes Y0 to Yn do not have to be parallel to one another or parallel to one side of the support substrate 101, either. The X-electrodes do not need to be orthogonal to the Y-electrodes.

The shape of the support substrate 101 depends on the design and does not need to be a rectangle. For example, the shape of the support substrate 101 may be a polygon having angles more than four or the sides of the support substrate 101 may be curved. The shapes of the electrodes depend on the design. For example, an electrode may be shaped like a strip or formed by connecting a plurality of wide units having a given shape (for example, a rhombus) with a narrow connector into a string. An example of the shape of the electrode will be described later with reference to FIG. 2.

The X-electrodes X0 to Xm and the Y-electrodes Y0 to Yn are connected with the electrode driving circuit 106. The electrode driving circuit 106 applies a specific voltage signal to each of the X-electrodes X0 to Xm and the Y-electrodes Y0 to Yn. The electrode driving circuit 106 is connected with the controller 107 through a control signal line. The configuration of the electrode driving circuit 106 is described later in detail with reference to FIG. 3.

The controller 107 controls the electrode driving circuit 106 based on information input from the external (for example, a processor for controlling the operation of the tactile presentation device 100) on the target area where to present a sense of texture.

The controller 107 includes a processor, a memory, a storage, and an interface to the external, for example. These components are interconnected with one another by internal wiring. The processor operates in accordance with a program stored in the memory to implement predetermined functions. The program to be executed and the data to be referenced by the processor can be loaded from the storage to the memory. The controller 107 may include a logical circuit for implementing a predetermined function in addition to or in place of the processor.

This configuration enables the tactile presentation device 100 to present a sense of texture (tactile senses) in a selected target area. Usually, a sense of texture is generated from fine asperities on the surface of an object. For example, when stroking the surfaces of objects such as cloth, paper, dry scaly skin, and glass with a finger, you can feel differences in sense of texture.

Figure 2:
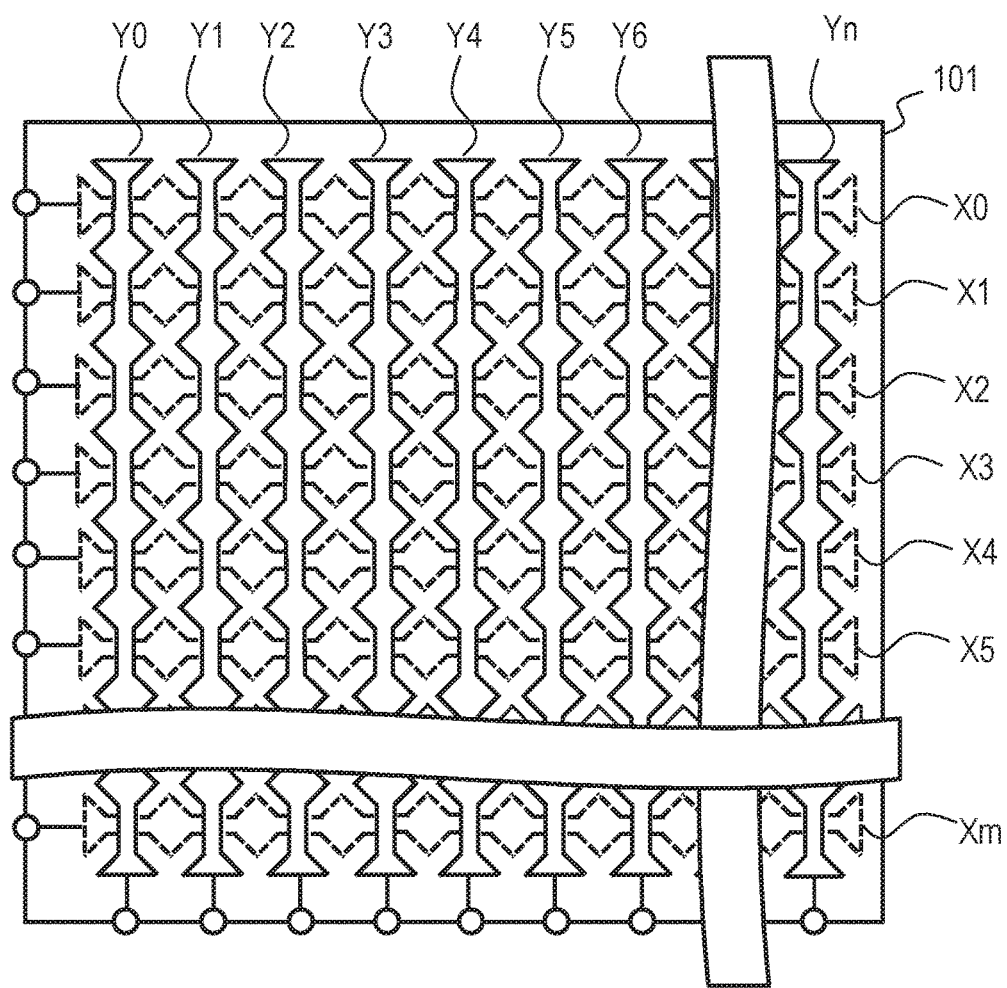
FIG. 2 schematically illustrates a configuration example a tactile panel according to an embodiment.

FIG. 2 schematically illustrates a configuration example a tactile panel 105. Each of the X-electrodes X0 to Xm has a shape such that multiple rhombic units are connected by a connector into a string. That is to say, an X-electrode is formed by electrically connecting horizontally-adjacent rhombic units with the connector and extends in a horizontal direction. In similar, each of the Y-electrodes Y0 to Yn has a shape such that multiple rhombic units are connected by a connector into a string. That is to say, a Y-electrode is formed by electrically connecting vertically-adjacent rhombic units with the connector and extends in a vertical direction.

When viewed vertically to the support substrate 101, the connectors of the rhombic units of the X-electrodes X0 to Xm and the connectors of the rhombic units of the Y-electrodes Y0 to Yn are overlapped with each other with an insulating film interposed therebetween. The main parts of the rhombic units of the X-electrodes X0 to Xm are not overlapped with the main parts of the rhombic units of the Y-electrodes Y0 to Yn. That is to say, the main parts of the rhombic units of the X-electrodes and the main parts of the rhombic units of the Y-electrodes are arrayed on the same plane.

Figure 3:
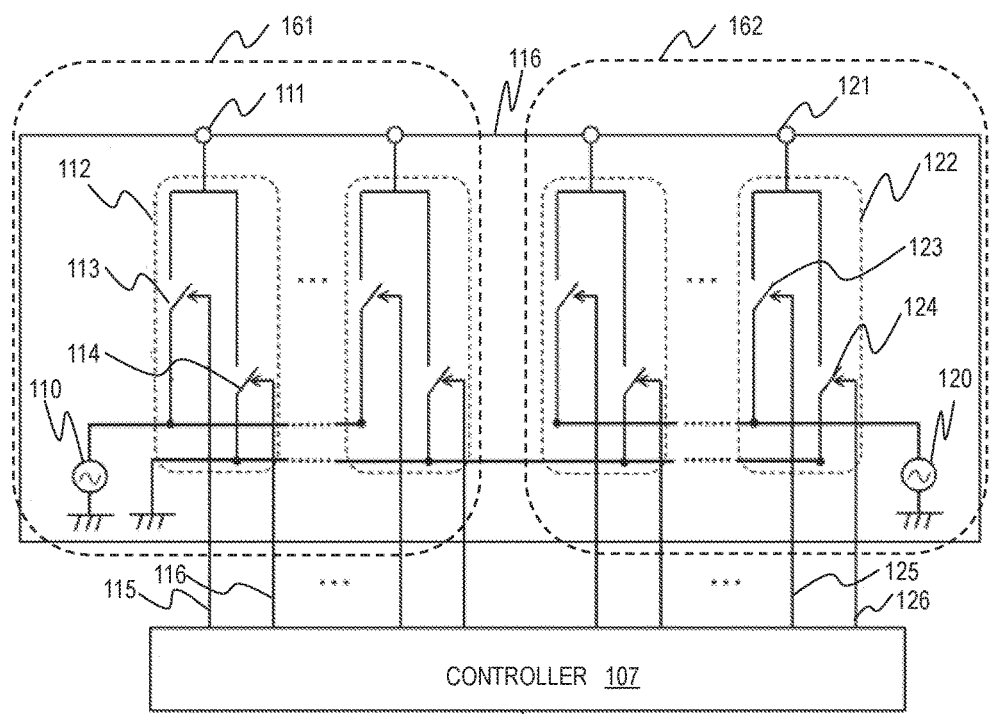
FIG. 3 schematically illustrates a configuration of the electrode driving circuit according to an embodiment.

FIG. 3 schematically illustrates a configuration of the electrode driving circuit 106. The electrode driving circuit 106 includes an X-electrode driving circuit 161 and a Y-electrode driving circuit 162. The X-electrode driving circuit 161 includes a first AC voltage signal source 110, a plurality of output terminals 111 connected with the X-electrodes, and a plurality of switching circuits 112 each connected with an output terminal 111. One output terminal 111 is connected with one or more X-electrodes. Each switching circuit 112 includes a switching element 113 to connect the output terminal 111 to the first AC voltage signal source 110 and a switching element 114 to connect the output terminal 111 to the ground.

The switching elements 113 and 114 turn into either a conducting state or an open state in response to control signals from the controller 107. The controller 107 sends the control signals to turn the switching elements 113 and 114 into a conducting state or an open state so as to accord with the information input from the external to specify the target area.

The controller 107 and each switching circuit 112 are connected by a control signal line 115 for the controller 107 to send a control signal to the switching element 113 and a control signal line 116 for the controller 107 to send a control signal to the switching element 114. When the switching element 113 is conducted, the X-electrode is connected to the first AC voltage signal source 110 and supplied with an AC voltage signal. When the switching element 114 is conducted, the X-electrode is connected to the ground.

The Y-electrode driving circuit 162 includes a second AC voltage signal source 120, a plurality of output terminals 121 connected with the Y-electrodes, and a plurality of switching circuits 122 connected with the output terminals 121. One output terminal 121 is connected with one or more Y-electrodes. Each switching circuit 122 includes a switching element 123 to connect the output terminal 121 to the second AC voltage signal source 120 and a switching element 124 to connect the output terminal 121 to the ground.

The switching elements 123 and 124 turn into either a conducting state or an open state in response to control signals from the controller 107. The controller 107 sends the control signals to turn the switching elements 123 and 124 into a conducting state or an open state so as to accord with the information input from the external to specify the target area.

The controller 107 and each switching circuit 122 are connected by a control signal line 125 for the controller 107 to send a control signal to the switching element 123 and a control signal line 126 for the controller 107 to send a control signal to the switching element 124. When the switching element 123 is conducted, the Y-electrode is connected to the second AC voltage signal source 120 and supplied with an AC voltage signal. When the switching element 124 is conducted, the Y-electrode is connected to the ground.

As will be described later, the first AC voltage signal source 110 and the second AC voltage signal source 120 have different frequencies. For example, the frequency f1 of the first AC voltage signal source 110 and the frequency f2 of the second AC voltage signal source 120 are both higher than 500 Hz and the difference between the frequencies is not less than 10 Hz and not more than 1000 Hz. Only one of the AC voltage signals at frequencies f1 and f2 does not present a sense of texture but the beat vibration generated by the frequencies f1 and f2 satisfies the condition to present a sense of texture.

In each of the switching elements 114 and 124 in the foregoing example, one of the nodes is connected to the ground. However, the connection point of the node is not limited to the ground. For example, the node may be connected to a DC voltage signal source that applies a voltage other than 0 V or a third AC voltage signal source.

The AC voltage signal from the third AC voltage signal source does not present a sense of texture by itself or even if beat vibration is generated with the first or the second AC voltage signal. These ground or a 0 V DC voltage signal source, non-0 V DC voltage signal source, and third AC voltage signal source are referred to as reference voltage signal source. In the following description, the reference voltage signal source is assumed to be the ground.

The frequencies and/or amplitudes of the first AC voltage signal source 110 and the second AC voltage signal source 120 may be changed within a tactile presentation frame or between tactile presentation frames. The first AC voltage signal source 110 and the second AC voltage signal source 120 may be different in value of a parameter other than the frequency. The first AC voltage signal source 110 and the second AC voltage signal source 120 may be different in phase. For example, the first AC voltage signal source 110 and the second AC voltage signal source 120 may have the same frequency and opposite phases. The electrode driving circuit 106 may be configured with one or more chips or modules. For example, the X-electrode driving circuit 161 and the Y-electrode driving circuit 162 may be mounted on different chips or a single chip.

Operation of Tactile Presentation Device

Figure 4:
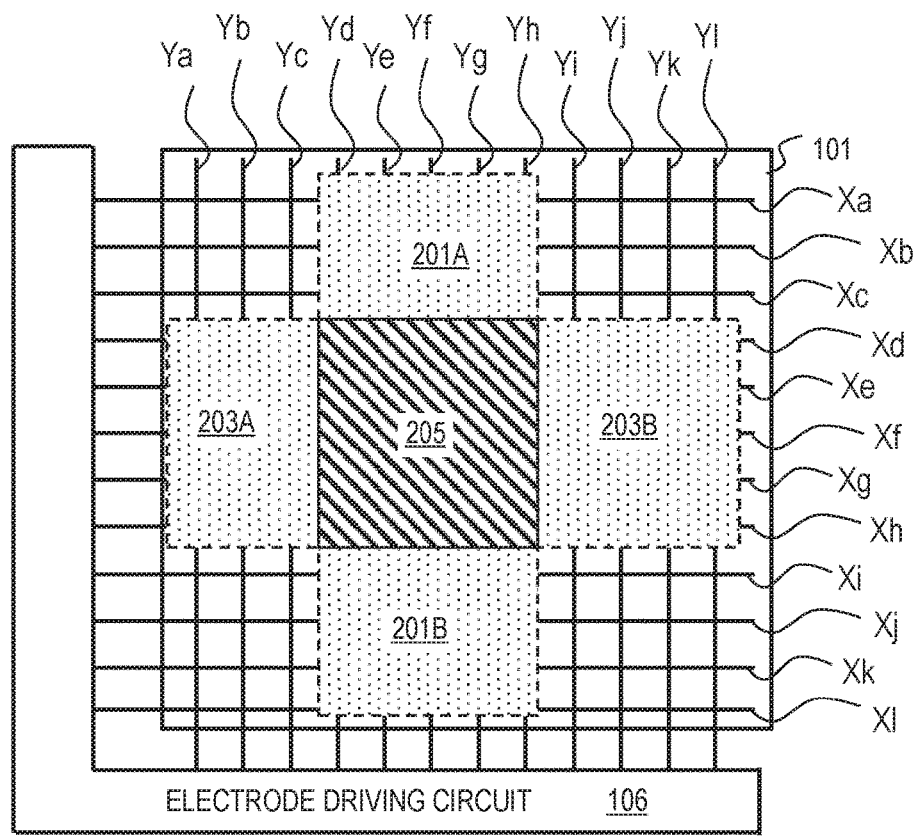
FIG. 4 illustrates an area (electrodes) to be supplied with specific AC voltage signals for a selected target area to present a sense of texture according to an embodiment.

With reference to FIG. 4, an outline of operation of the tactile presentation device 100 to present a sense of texture in a target area is described. FIG. 4 depicts an area (electrodes) to be supplied with specific AC voltage signals for a selected target area 205 to present a sense of texture. In the example of FIG. 4, X-electrodes Xa to Xl and Y-electrodes Ya to Yl are disposed on the support substrate 101.

In the example of FIG. 4, the target area 205 is an area where the X-electrodes Xd to Xh intersect with the Y-electrodes Yd to Yh. When viewed in a direction perpendicular to the face of the support substrate 101, the X-electrodes Xd to Xh and the Y-electrodes Yd to Yh overlap with the target area 205. The controller 107 provides control signals to the electrode driving circuit 106 based on the information on the target area 205 given from the external. The electrode driving circuit 106 drives the electrodes in accordance with the control signals from the controller 107.

In the example of FIG. 4, the electrode driving circuit 106 applies a first AC voltage signal to the X-electrodes Xd to Xh with the first AC voltage signal source 110. The electrode driving circuit 106 applies a second AC voltage signal to the Y-electrodes Yd to Yh with the second AC voltage signal source 120. For example, the frequency f1 of the first AC voltage signal is 1000 Hz and the frequency f2 of the second AC voltage signal is 1240 Hz. The electrode driving circuit 106 connects the other X-electrodes and Y-electrodes to the ground.

In the target area 205, the X-electrodes supplied with the AC voltage signal having the frequency f1 and the Y-electrodes supplied with the AC voltage signal having the frequency f2 are adjacent to each another. Accordingly, electric beat vibration at a frequency |f1-f2| (for example, 240 Hz) is generated. This beat vibration provides a sense of texture to the contacting part of the human body, which is typically a finger.

The user perceives the sense of texture only in the target area 205 and does not perceive the sense of texture outside the target area 205. In the example of FIG. 4, parts of the X-electrodes Xd to Xh and the Y-electrodes Yd to Yh are included in the target area 205 and the other parts extend outside the target area 205. Accordingly, in the area outside the target area 205, an AC voltage signal to present the sense of texture is applied to the X-electrodes Xd to Xh or the Y-electrodes Yd to Yh.

Specifically, in the areas 201A and 201B adjoining the target area 205, only the Y-electrodes Yd to Yh are supplied with the AC voltage signal having the frequency f2 and the X-electrodes are grounded. In the areas 203A and 203B adjoining the target area 205, only the X-electrodes Xd to Xh are supplied with the AC voltage signal having the frequency f1 and the Y-electrodes are grounded. Such areas in which only either X-electrodes or Y-electrodes are supplied with an AC voltage signal to present a sense of texture are referred to as single signal areas.

A human finger perceives a sense of texture in response to vibration of electrostatic force in a specific frequency range. Accordingly, the electrode driving circuit 106 applies a signal having a frequency for a human sense organ to hardly feel vibration at the frequency by itself to pertinent electrodes. In a single signal area, electrostatic force that vibrates at a frequency twice of the frequency of the AC voltage signal applied to the electrodes is generated. The electrode driving circuit 106 further applies a signal having another frequency to pertinent electrodes to generate beat of the two AC voltage signals to be felt easily. For example, frequencies f1 and f2 are higher than 500 Hz and the difference frequency |f1-f2| is in a range from 10 Hz to 1000 Hz.

In this way, the electrode driving circuit 106 applies AC voltage signals having frequencies within a specific range to the X-electrodes and the Y-electrodes included in the target area to present a sense of texture only in the target area. As described above, to the other X-electrodes and Y-electrodes, the electrode driving circuit 106 may apply a specific DC voltage or an AC voltage that does not present a sense of texture, instead of connecting to the ground.

The tactile presentation device 100 can change the position and the shape of the target area by changing the electrodes to apply the AC voltage signals. For example, the tactile presentation device 100 can continuously move the target area like a motion picture.

For example, if the support substrate 101, the X-electrodes Xa to Xl, and the Y-electrodes Ya to Yl are transparent, the tactile panel 105 can be stacked on a visual display to be used. For example, the support substrate 101 may be made of glass or resin and the electrodes may be made of ITO (indium tin oxide). The tactile presentation device 100 can present tactile senses associated with the image displayed by the visual display. The tactile presentation device does not need to be combined with a visual display. For example, the tactile presentation device 100 may be a tablet device that presents tactile senses without displaying images.

Figure 5:
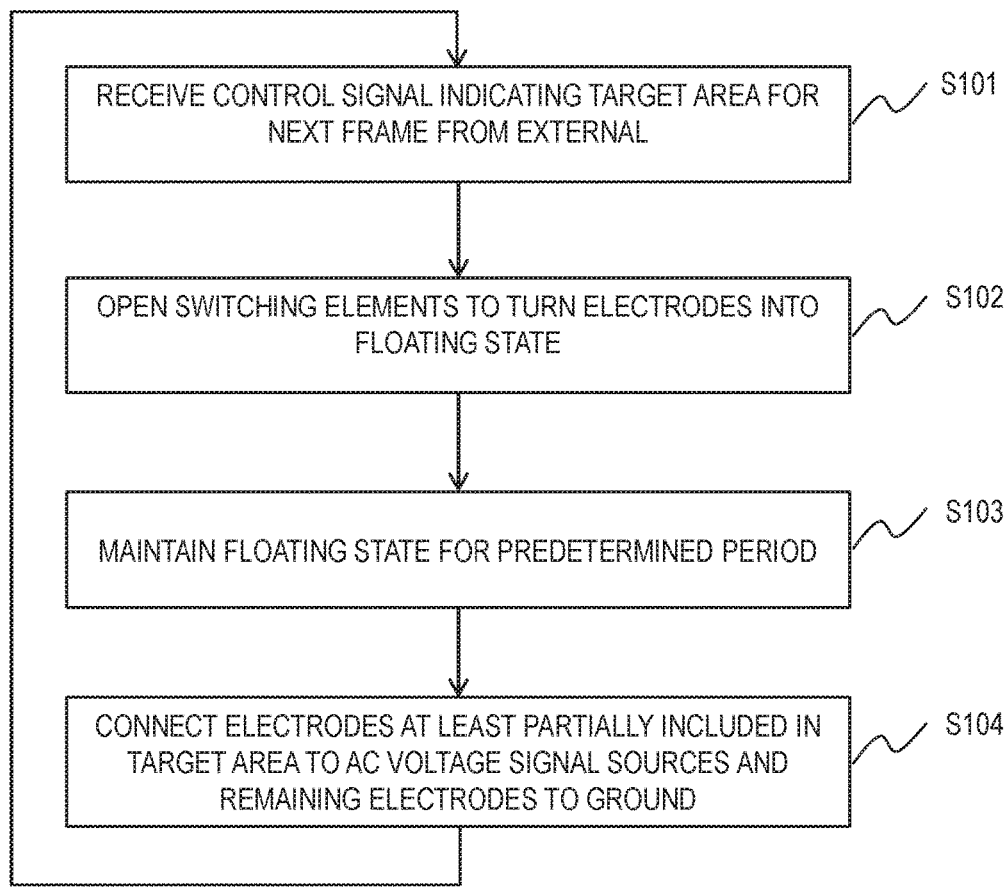
FIG. 5 is a flowchart of the operation of a tactile presentation device that presents tactile senses on a frame-by-frame basis according to an embodiment.

The tactile presentation device 100 presents tactile senses in each frame (tactile presentation frame) and updates the target area frame by frame. For example, the tactile presentation device 100 changes the target area frame by frame and maintains the target area within one frame. The tactile presentation device 100 may change frames in a specific cycle regardless of whether the target area changes or not. The target area to be updated for the next frame may be either the same as or different from the target area in the previous frame. FIG. 5 is a flowchart of the operation of a tactile presentation device 100 that presents tactile senses on a frame-by-frame basis. While tactile senses are presented on a target area in the Nth frame (referred to as N frame and N is a natural number), the controller 107 receives information on a target area for the next N+1 frame (S101). The electrode driving circuit 106 opens all switching elements 113, 114, 123, 124 of the switching circuits 112 and 122 in accordance with instructions from the controller 107. All of the X-electrodes and Y-electrodes turn into a floating state (S102).

The electrode driving circuit 106 keeps all of the switching elements 113, 114, 123, and 124 open to maintain the floating state of all electrodes for a predetermined period (S103). As a result, the AC voltage signal sources are shorted to the ground (reference voltage signal sources) to prevent breakage of the circuits. This disclosure is featured by the period of maintaining the floating state. This point will be described later in detail.

When the predetermined period has passed since the switching elements are opened, the controller 107 applies predetermined signals to the pertinent electrodes (S104). Specifically, the controller 107 sends control signals to the switching circuits 112 and 122 for the X-electrodes and the Y-electrodes at least partially included in the target area for the N+1 frame. The switching circuits 112 that have received the control signal turn the switching elements 113 into a conducting state. The selected X-electrodes are supplied with a first AC voltage signal from the first AC voltage signal source 110.

In similar, the switching circuits 122 that have received the control signal turn the switching elements 123 into a conducting state. The selected Y-electrodes are supplied with a second AC voltage signal from the second AC voltage signal source 120.

Further, the controller 107 sends control signals to the switching circuits 112 and 122 for the X-electrodes and the Y-electrodes excluded from the target area for the N+1 frame. The switching circuits 112 that have received the control signal turn the switching elements 114 into a conducting state. The selected X-electrodes are connected to the ground. In similar, the switching circuits 122 that have received the control signal turn the switching elements 124 into a conducting state. The selected Y-electrodes are connected to the ground. The states of the electrodes for the N+1 frame are maintained until information on the next N+2 frame is input to the controller 107.

The tactile presentation device 100 repeats the processing illustrated in FIG. 5 to successively present tactile senses in multiple frames. As described above, the tactile presentation device 100 changes frames together with or independently from a change of the target area. The tactile presentation device 100 may divide the X-electrodes and the Y-electrodes into groups. The tactile presentation device 100 changes the voltages to apply on a group-by-group basis in the change from the N frame to the N+1 frame.

Issue of Generation of Unnecessary Tactile Senses

The tactile presentation device 100 is desired to present a sense of texture only in the target area and substantially not to present a sense of texture outside the target area. Setting the frequencies of the voltage signals to be applied to the electrodes within a predetermined range enables a sense of texture to be presented only in the target area in a frame.

However, the inventors found that the tactile presentation device 100 sometimes presents an unnecessary sense of texture (unnecessary tactile senses) in a single signal area when frames are changed. When the voltage signals to the electrodes are maintained in a frame, no sense of texture is presented in a single signal area. However, the inventors found that an unnecessary sense of texture is presented in a single signal area when a frame is changing to the next frame. In other words, unnecessary tactile senses are presented outside the target area and the "localization of tactile senses" fails.

Figure 6:
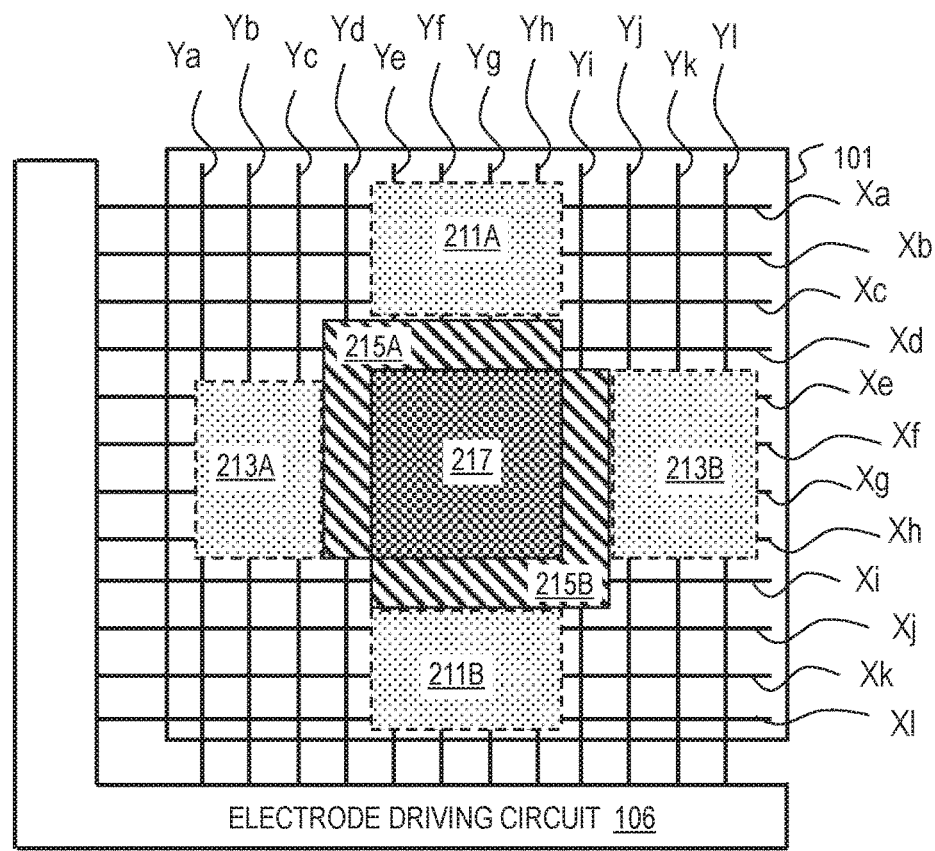
FIG. 6 schematically illustrates an example of a change of the target area between an N frame and an N+1 frame according to an embodiment.

Presentation of an unnecessary sense of texture is described with reference to FIG. 6. FIG. 6 schematically illustrates an example of a change of the target area between an N frame and an N+1 frame. The target area in the N frame is the area 215A and the target area in the N+1 frame is the area 215B. The target area changes from the area 215A to the area 215B. FIG. 6 depicts an example of a shift of the target area; the target areas 215A and 215B are identical in contour and different in position. The area 217 is the overlap area between the target area 215A in the N frame and the target area 215B in the N+1 frame.

In the areas 213A and 213B, the X-electrodes Xe to Xh common to the N frame and the N+1 frame are supplied with the first AC voltage signal and the Y-electrodes are not supplied with the second AC voltage signal. In the areas 211A and 211B, the Y-electrodes Ye to Yh common to the N frame and the N+1 frame are supplied with the second AC voltage signal and the X-electrodes are not supplied with the first AC voltage signal. That is to say, the areas 211A, 211B, 213A, and 213B are single signal areas in both of the N frame and the N+1 frame.

In the research of the inventors, the areas 211A, 211B, 213A, and 213B presented an unnecessary sense of texture to the contact finger. In the following, the cause of the unnecessary sense of texture determined by the inventors is described. Described hereinafter with reference to FIG. 7 is the cause of the unnecessary sense of texture in the areas 211A and 211B, but the same applies to the areas 213A and 213B.

Figure 7:
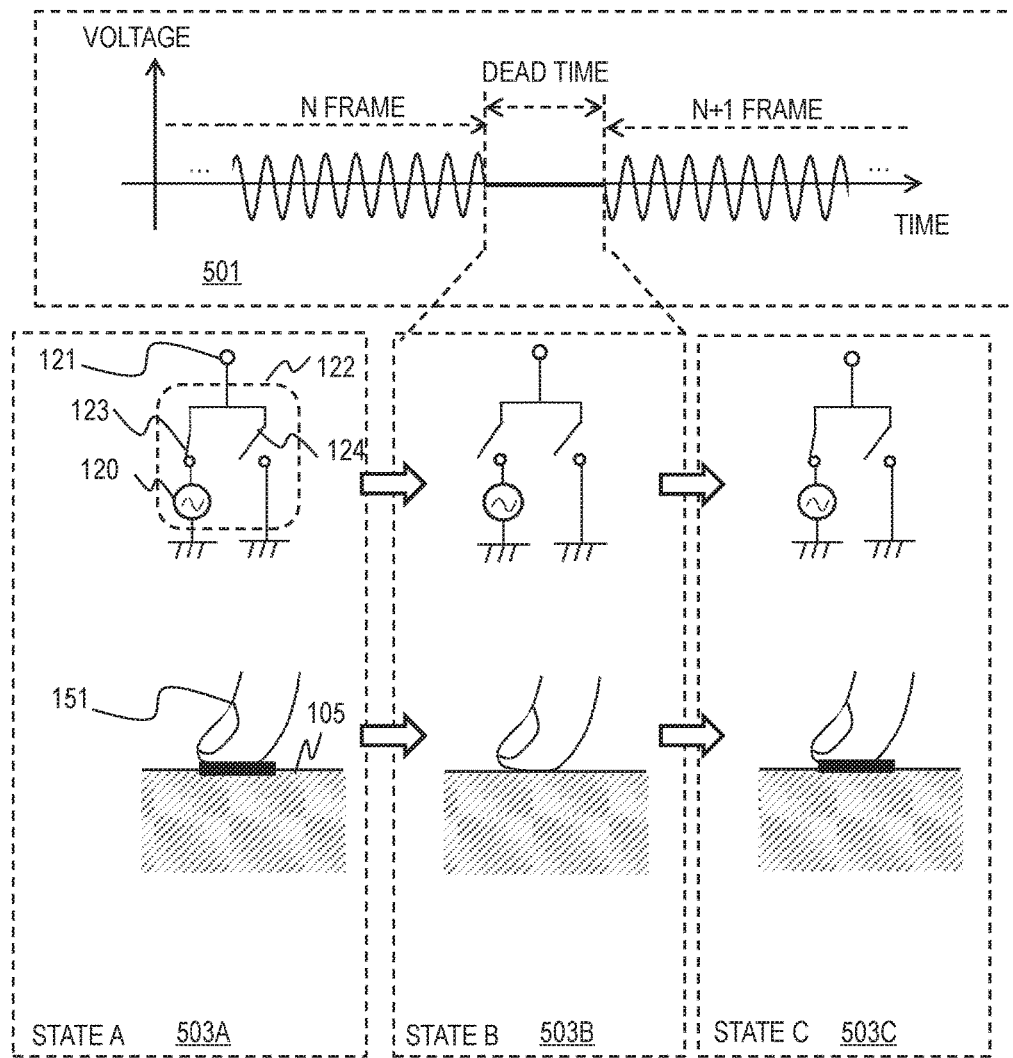
FIG. 7 schematically illustrates changes in state in the area according to an embodiment.

FIG. 7 schematically illustrates changes in state in the area 211A or 211B. The graph 501 schematically depicts the voltage signal applied to the Y-electrodes Ye to Yh in transition from the N frame to the N+1 frame. State A (503A) depicts a state of the switching circuit 122 and a state of the tactile panel 105 and a finger 151 in the N frame. State B (503B) depicts a state of the switching circuit 122 and a state of the tactile panel 105 and the finger 151 in the transition period from the N frame to the N+1 frame. State C (503C) depicts a state of the switching circuit 122 and a state of the tactile panel 105 and the finger 151 in the N+1 frame.

In the N frame, the second AC voltage signal is applied to each of the Y-electrodes Ye to Yh. As shown in State A (503A), the switching element 123 of the switching circuit 122 connects the output terminal 121 to the second AC voltage signal source 120. The switching element 124 is open. Vibrating electrostatic force is generated between the tactile panel 105 and the finger 151. As described above, since the frequency of the electrostatic force is out of the predetermined range, the finger 151 does not perceive a sense of texture.

In the transition period (interval) from the N frame to the N+1 frame, the voltage at each of the Y-electrodes Ye and Yh is constant. As shown in State B (503B), the switching element 123 and the switching element 124 of the switching circuit 122 are open to prevent shortage between the second AC voltage signal source 120 and the ground.

When the switching elements 123 and 124 are open, the Y-electrodes Ye to Yh are in a floating state. In this disclosure, the duration of the floating state is referred to as dead time. The dead time corresponds to the transition time (interval) between frames. The voltage at an electrode in a floating state is not always 0 but depends on the voltage when the electrode turns into the floating state. In the dead time, vibrating electrostatic force is not generated between the tactile panel 105 and the finger.

In the N+1 frame, the second AC voltage signal is applied to each of the Y-electrodes Ye to Yh. As shown in State C (503C), the switching element 123 of the switching circuit 122 connects the output terminal 121 to the second AC voltage signal source 120. The switching element 124 is open. Vibrating electrostatic force is generated between the tactile panel 105 and the finger 151. As described above, since the frequency of the electrostatic force is out of the predetermined range, the finger 151 does not perceive a sense of texture.

As a result of the research, the inventors determined that the change in electrostatic force in transition from a frame to the next including a dead time causes the user to perceive the unnecessary sense of texture. Even at the frequency that does not generate a sense of texture in a frame, an interruption of vibrating electrostatic force makes a human perceive an unnecessary sense of texture.

If the electrodes do not have a floating state, the sense of texture is not generated in a single signal area. In this case, the AC voltage signal is continuously applied to the single signal area and the frequency spectrum of the vibration is concentrated at the twice (for example, 2000 Hz) of the frequency of the AC voltage signal. Since the frequency of 2000 Hz is not felt by a human body, a sense of texture is not generated. Because of the interruption of the vibration of electrostatic force caused by the floating state, the frequency spectrum of the vibration generated in the single signal area spreads widely from the twice of the frequency of the AC voltage signal, even to the range of 10 to 1000 Hz well perceivable by the human body. This is considered to be the reason why a sense of texture is presented in the single signal area.

Control to Reduce Unnecessary Tactile Senses

The inventors have newly invented a technique to reduce the unnecessary sense of texture outside the target area by reducing the dead time. The dead time is necessary to prevent shortage of the switching circuits. Accordingly, it is demanded to set a dead time that minimizes the unnecessary sense of texture but prevents shortage of the switching circuits.

Figures 8A, 8B:
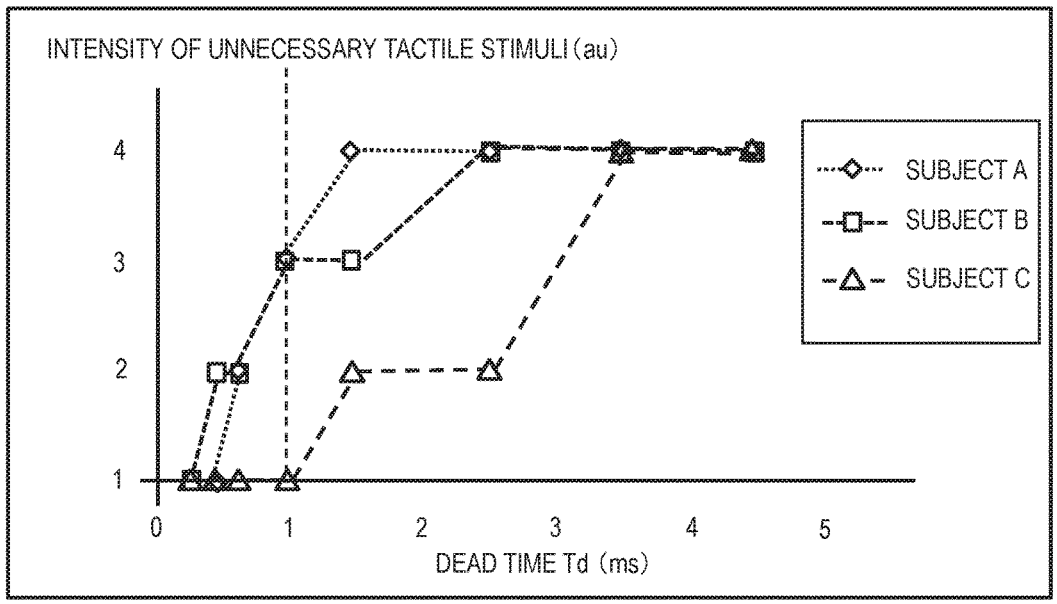
FIG. 8A illustrates measurement results of the relationship between the dead time Td and the intensity of the unnecessary sense of texture (unnecessary tactile senses) according to an embodiment.
FIG. 8B illustrates measurement results of the relationship between the dead time Td and the intensity of the unnecessary sense of texture (unnecessary tactile senses) according to an embodiment.

The inventors conducted a subjective evaluation experiment with three subjects and evaluated the relationship between the dead time Td and the intensity of the unnecessary sense of texture (unnecessary tactile senses). FIGS. 8A and 8B depict measurement results. The tactile panel 105 having the structure depicted in FIG. 2 was used in the measurement. The graph in FIG. 8A and the table in FIG. 8B depict the same measurement results.

The subjects evaluated the intensity of unnecessary tactile senses subjectively. With respect to the unnecessary tactile sense intensity indicator, a higher value represents stronger unnecessary tactile senses. In FIGS. 8A and 8B, the indicator value for the strongest unnecessary tactile senses is 4 and the indicator value for the weakest unnecessary tactile senses is 1. The unnecessary tactile sense intensity indicator value 1 means that substantially no unnecessary tactile senses are perceived. Although not depicted in the drawings, the inventors conducted the subjective evaluation experiment on the intensity of unnecessary tactile senses with the dead times of 5 ms to 100 ms. In this range of dead time, all of the subjects evaluated the unnecessary tactile sense intensity indicator as 4.

As understood from the experiment results depicted in FIGS. 8A and 8B, every subject perceives a certain level (indicator value of 4) of unnecessary tactile senses with a dead time longer than a specific period Tdth1 and perceives reduction in unnecessary tactile sense intensity with a dead time of the specific period Tdth1. Specifically, Subject A, Subject B, and Subject C perceive a certain level (indicator value of 4) of unnecessary tactile senses with a dead time longer than 1.5 ms, 2.5 ms, and 3.5 ms, respectively. Furthermore, Subject A, Subject B, and Subject C perceive reduction in unnecessary tactile sense intensity with a dead time of 1.0 ms, 1.5 ms, and 2.5 ms, respectively.

Furthermore, all subjects perceive reduction in unnecessary tactile sense intensity with reduction in dead time after the dead time is reduced to the specific period. That is to say, the unnecessary tactile sense intensity perceived by the subjects falls (and never increases) with reduction in dead time. For example, the unnecessary tactile sense intensity of Subject B falls from 3 to 2, 2, and to 1, after the dead time is reduced to 1.0 ms.

That is to say, a characteristic of the tactile presentation device 100 is to present substantially uniform unnecessary tactile sense intensity F1 with a dead time in the range longer than a specific period (threshold Tdth1) and unnecessary tactile sense intensity lower than the unnecessary tactile sense intensity F1 with a dead time in the range not longer than the specific period Tdth1. Therefore, the unnecessary tactile sense intensity can be effectively reduced by setting the dead time Td of the electrode driving circuit 106 at a period within a range longer than 0 and shorter than or equal to Tdth1 in accordance with such a device characteristic of the tactile presentation device 100.

The electrode driving circuit 106 maintains the electrodes in a floating state for the period (dead time Td) set within a range longer than 0 and not longer than Tdth1. The electrode driving circuit 106 opens the two switching elements connected with the electrodes, and after passage of the dead time Td, turns one of the switching elements into a conducting state.

As described above, the unnecessary tactile senses can be effectively reduced by setting the dead time Td to maintain the electrodes in a floating state at a period not longer than the value Tdth1 which is determined depending on the device characteristic of the tactile presentation device 100 and is a threshold for weaker unnecessary tactile senses. The unnecessary tactile senses with the dead time Td is weaker than the unnecessary tactile senses with a dead time of any period (first period) longer than the period Tdth1.

As understood from the experiment results depicted in FIGS. 8A and 8B, none of the subjects perceive unnecessary tactile senses with a dead time not longer than this specific period. Specifically, Subject A, Subject B, and Subject C do not perceive unnecessary tactile senses (indicator value 1) with a dead time not longer than 0.4 ms, 0.3 ms, and 1.0 ms, respectively.

That is to say, the tactile presentation device 100 has a characteristic not to present unnecessary tactile senses with a dead time within a range not longer than a specific period Tdth2. Accordingly, generation of unnecessary tactile senses can be effectively prevented by setting the dead time Td for the electrode driving circuit 106 at a period within a range longer than 0 and not longer than Tdth2 in accordance with such a device characteristic of the tactile presentation device 100.

For example, in designing the tactile presentation device 100, the designer determines the relation between the unnecessary tactile sense intensity and the dead time through measurement on a sample device like the above-described evaluation experiment. The designer determines the dead time Tdth1 where the unnecessary tactile senses start getting weaker or the dead time Tdth2 where no unnecessary tactile senses are presented from the measurement result. The designer determines the dead time to be a period within a range longer than 0 and not longer than Tdth1 or Tdth2, in terms of prevention of shortage in the electrode driving circuit 106 and the unnecessary tactile senses.

As described above, Subject A, Subject B, and Subject C perceive reduction in unnecessary tactile sense intensity with dead times of 1.0 ms, 1.5 ms, and 2.5 ms, respectively. That is to say, all subjects perceive the reduction in unnecessary tactile sense intensity with a dead time Td in the range not longer than 1.0 ms. From the viewpoint of the tactile presentation, this period is considered to be shorter than generally expected. The unnecessary tactile sense intensity can be reduced unfailingly by setting the dead time Td for the electrode driving circuit 106 at such a short period within a range longer than 0 and not longer than 1.0 ms.

Furthermore, Subject A, Subject B, and Subject C do not perceive unnecessary tactile senses with dead times not longer than 0.4 ms, 0.3 ms, and 1.0 ms, respectively. That is to say, none of the subjects perceive unnecessary tactile senses with a dead time not longer than 0.3 ms. Generation of unnecessary tactile senses can be prevented more unfailingly by setting the dead time Td for the electrode driving circuit 106 at a period within a range longer than 0 and not longer than 0.3 ms.

Figure 9:
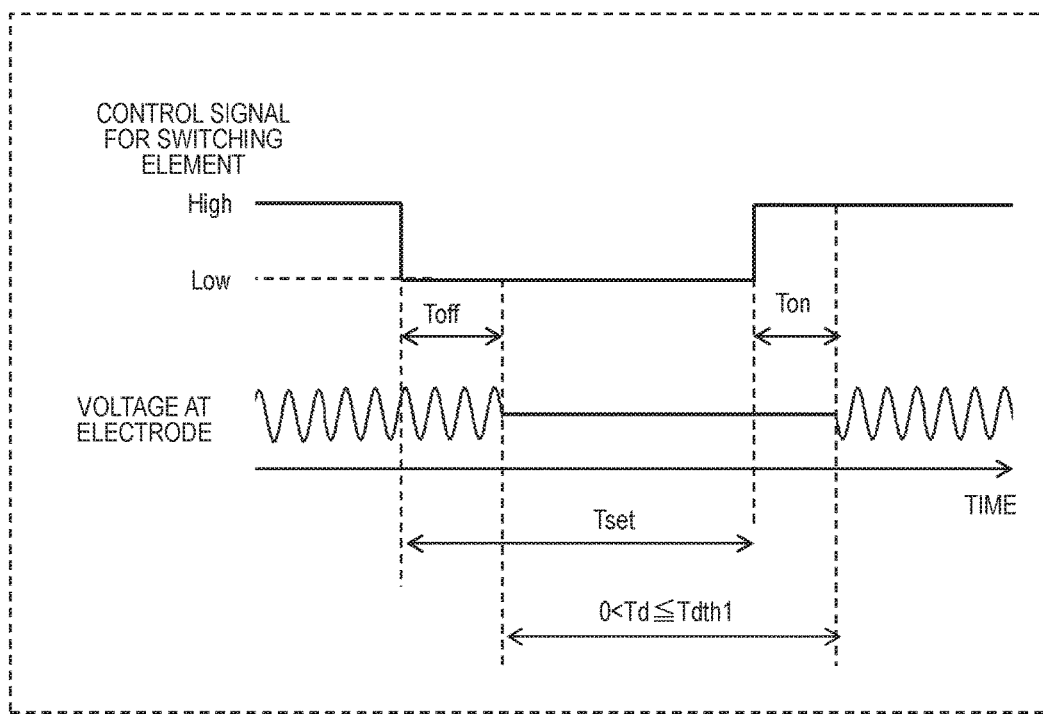
FIG. 9 schematically illustrates a relation between the control signal to a switching element and the voltage at the electrode in a single signal area according to an embodiment.

The controller 107 controls the electrode driving circuit 106 so that the dead time Td will be the preset period, or the electrodes will be in a floating state for the preset period. The control of the electrode driving circuit 106 performed by the controller 107 is described with reference to FIG. 9. FIG. 9 schematically illustrates a relation between the control signal to a switching element (switching element 113, 114, 123 or 124) and the voltage at the electrode in a single signal area.

For a switching element, a turning off time Toff and a turning on time Ton are determined in accordance with the specifications. The turning off time is the transition time required for the switching element to become an open state after receiving a control signal in a conducting state. The turning on time is the transition time required for the switching element to become a conducting state after receiving a control signal in an open state.

In the example of FIG. 9, the polarity of the control signal for the switching element is normally open. When the control signal is at low level, the switching element is opened and when the control signal is at high level, the switching element is conducted.

The controller 107 changes the control signal from high level to low level and thereafter, maintains the control signal at low level for a preset dead time setting period Tset. The controller 107 changes the control signal from low level to high level when the dead time setting period Tset has passed since the controller 107 changes the control signal from high level to low level.

The switching element changes from a conducting state to an open state when the turning off period Toff has passed since the falling edge of the control signal. Accordingly, the electrode changes from the state where the AC voltage signal is applied to a floating state when the turning off period Toff has passed since the falling edge of the control signal.

The switching element changes from the open state to a conducting state when the turning on period Ton has passed since the rising edge of the control signal. Accordingly, the electrode changes from the floating state to a state where the AC voltage signal is applied when the turning on period Ton has passed since the rising edge of the control signal.

The dead time setting period Tset, the dead time Td, the turning off period Toff, and the turning on period Ton satisfy the following relation:

$$Tset=Td+Toff-Ton.$$

The turning off period Toff and the turning on period Ton are determined in accordance with the specifications of the electrode driving circuit 106. The designer determines the dead time Td to be a period within a range where shortage does not occur in the switching circuit and the unnecessary sense of texture outside the target area is effectively reduced. The designer determines the dead time setting period Tset in accordance with the above formula with the determined dead time Td, the turning off period Toff, and the turning on period Ton. The dead time setting period Tset can be common to all switching circuits or different among the switching circuits.

The invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

What is claimed is:
1. A tactile presentation device comprising:
a support substrate;
a plurality of first electrodes insulated from each other and disposed on the support substrate;
a plurality of second electrodes insulated from each other and further insulated from the plurality of first electrodes, and disposed on the support substrate; and an electrode driving circuit configured to drive the plurality of first electrodes and the plurality of second electrodes, wherein the electrode driving circuit is configured to:
connect each of the plurality of first electrodes and the plurality of second electrodes to a voltage signal source selected from a plurality of voltage signal sources including two different AC voltage signal sources and a reference voltage signal source;

connect first electrodes at least partially included in a target area among the plurality of first electrodes to an AC voltage signal source and connect second electrodes at least partially included in the target area among the plurality of second electrodes to another AC voltage signal source to present tactile senses in the target area; and in transition from a tactile presentation frame to the next tactile presentation frame, turn each of the plurality of first electrodes and the plurality of second electrodes into a floating state and subsequently connect each of the plurality of first electrodes and the plurality of second electrodes to a voltage signal source selected from the plurality of voltage signal sources, and wherein a time to keep the floating state is set at a period shorter than a first period for unnecessary tactile senses presented outside the target area to be weaker than unnecessary tactile senses presented outside the target area in the first period.

2. The tactile presentation device according to claim 1, wherein the time to keep the floating state is set at a period in which unnecessary tactile senses are not presented outside the target area.

3. The tactile presentation device according to claim 1, wherein the time to keep the floating state is set at a period within a range longer than 0 and not longer than 1.0 ms.

4. The tactile presentation device according to claim 1, wherein the time to keep the floating state is set at a period within a range longer than 0 and not longer than 0.3 ms.

5. The tactile presentation device according to claim 1, wherein the two different AC voltage signal sources are configured to output AC voltage signals having frequencies different from each other.

6. A method of controlling a tactile presentation device, the tactile presentation device including:
a support substrate;
a plurality of first electrodes insulated from each other and disposed on the support substrate; and
a plurality of second electrodes insulated from each other and further insulated from the plurality of first electrodes, and disposed on the support substrate, and the method comprising:
connecting each of the plurality of first electrodes and the plurality of second electrodes to a voltage signal source selected from a plurality of voltage signal sources including two different AC voltage signal sources and a reference voltage signal source;

connecting first electrodes at least partially included in a target area among the plurality of first electrodes to an AC voltage signal source and connecting second electrodes at least partially included in the target area among the plurality of second electrodes to another AC voltage signal source to present tactile senses in the target area; and turning each of the plurality of first electrodes and the plurality of second electrodes into a floating state and subsequently connecting each of the plurality of first electrodes and the plurality of second electrodes to a voltage signal source selected from the plurality of voltage signal sources in transition from a tactile presentation frame to the next tactile presentation frame, wherein a time to keep the floating state is set to a period shorter than a first period for unnecessary tactile senses presented outside the target area to be weaker than unnecessary tactile senses presented outside the target area in the first period.

7. The method according to claim 6, wherein the time to keep the floating state is set to a period in which unnecessary tactile senses are not presented outside the target area.

8. The method according to claim 6, wherein the time to keep the floating state is set at a period within a range longer than 0 and not longer than 1.0 ms.

9. The method according to claim 6, wherein the time to keep the floating state is set at a period within a range longer than 0 and not longer than 0.3 ms.

10. The method according to claim 6, wherein the two different AC voltage signal sources are configured to output AC voltage signals having frequencies different from each other.

* * * * *